United States Patent
Draganov

(10) Patent No.: US 6,832,155 B2
(45) Date of Patent: Dec. 14, 2004

(54) METHODS AND APPARATUS FOR DETERMINING PHASE AMBIGUITIES IN RANGING AND NAVIGATION SYSTEMS

(75) Inventor: Alexandr Draganov, Reston, VA (US)

(73) Assignee: ITT Manufacturing Enterprises, Inc., Willmington, DE (US)

( * ) Notice: Subject to any disclaimer, the term of this patent is extended or adjusted under 35 U.S.C. 154(b) by 99 days.

(21) Appl. No.: 10/252,110

(22) Filed: Sep. 23, 2002

(65) Prior Publication Data

US 2004/0225438 A1 Nov. 11, 2004

(51) Int. Cl.[7] .............................. G01S 5/02; G01S 5/14; H04B 7/185
(52) U.S. Cl. ........................ 701/213; 701/207; 342/422
(58) Field of Search ................................ 701/213, 207, 701/214; 342/357.04, 422, 352, 463, 424, 458, 357.11

(56) References Cited

U.S. PATENT DOCUMENTS

| | | | | |
|---|---|---|---|---|
| 5,296,861 A | * | 3/1994 | Knight | 342/357.11 |
| 5,343,212 A | * | 8/1994 | Rose et al. | 343/424 |
| 5,825,326 A | * | 10/1998 | Semler et al. | 342/357.04 |
| 6,052,082 A | * | 4/2000 | Hassan et al. | 342/357.04 |
| 6,311,129 B1 | * | 10/2001 | Lin | 701/214 |
| 2003/0052817 A1 | * | 3/2003 | Diggelen | 342/357.09 |

* cited by examiner

Primary Examiner—Tan Q. Nguyen
Assistant Examiner—Dalena Tran
(74) Attorney, Agent, or Firm—Edell, Shapiro, Finnan, LLC

(57) ABSTRACT

An improved technique for determining the integer value of phase ambiguities (integer ambiguities) of pseudorange measurements based on the carrier phase of received navigation signals provides more accurate ranging and position determination in navigation and ranging systems. A Bayesian methodology is employed to estimate the probability that each of a group of candidate integer ambiguity values is the correct value of the integer ambiguity at each pseudorange measurement time epoch. The candidate having the highest probability is selected as the value of the integer ambiguity, and the selected value is used to estimate the pseudorange and geographic position at each time epoch. The probability estimates are computed based on factors including: the code-based and carrier-based pseudorange measurements, the estimated variability of these measurements, integer ambiguity probabilities computed at the preceding time epoch, and the probability of a cycle slip from the preceding time epoch to the present time epoch.

25 Claims, 9 Drawing Sheets

METHODS AND APPARATUS FOR DETERMINING PHASE AMBIGUITIES IN RANGING AND NAVIGATION SYSTEMS

BACKGROUND OF THE INVENTION

1. Field of the Invention

The present invention relates to methods and apparatus for determining phase ambiguities in ranging and navigation systems and, more particularly, to techniques for rapidly and accurately detecting cycle slips in pseudorange measurements based on the carrier phase of navigation signals.

2. Description of the Related Art

Navigation systems such as the Global Positioning System (GPS) enable users to determine their present position based on received navigation signals. For example, the GPS architecture includes a constellation of twenty-four satellites that orbit the earth twice a day. The orbits of the GPS satellites are chosen so that navigation information can be provided to users regardless of the time that the user requests information and regardless of the user's position on the earth's surface. This information contains a navigation message that includes satellite position and satellite clock drift information.

The user's GPS receiver operates by performing a radio-ranging calculation which involves acquiring the encoded signals transmitted by each GPS satellite and making pseudorange measurements. Pseudorange is the distance from the user to the source of the signal (i.e., to GPS satellites), with some errors included in it, such as satellite clock bias, etc. Using trilateration techniques, pseudorange measurements received from several satellites are processed in real time to provide the best estimate of the user's position (latitude, longitude, and altitude), velocity, and system time.

There are essentially two types of pseudorange measurements. One type is code-based and involves tracking the code (modulation) of the GPS signal to determine the pseudorange. The advantage of code-based pseudorange measurements is that they are absolute pseudorange measurements: the results of the measurements differ from the true pseudorange by the measurement noise only. The disadvantage of code-based pseudorange measurements is that the measurement noise may be large enough to adversely affect the accuracy of the position estimation.

The other type of pseudorange measurement is carrier-based and involves tracking the carrier phase of the GPS signal. Phase measurements of the carrier signal typically have much lower noise, but these phase measurements are offset from the absolute value of the pseudorange by some unknown integer number of wavelengths. Typically, this number, called the integer phase ambiguity or simply "integer ambiguity", can be maintained constant from one measurement time epoch to another, though a receiver may occasionally suffer from so-called cycle slips, which change the integer ambiguity in an unpredictable way. For example, the receiver, which continuously tracks the carrier phase, may momentarily lose track of the phase and, upon reacquisition, may report the phase as being several carrier cycles (wavelengths) greater or less than the phase just prior to loss of track, resulting in a sudden jump (i.e., a cycle slip) in the reported value of the carrier-based pseudorange measurement. Thus, phase measurements per se are useless, unless there is a method to determine and eliminate the integer ambiguity bias, including detection of cycle slips.

A number of techniques exist for correcting integer ambiguities in GPS measurements, each having certain shortcomings. Smoothing techniques typically involve averaging and combining code measurements with phase measurements to determine the integer phase ambiguity. However, conventional smoothing techniques require long start-up times after satellites appear in view or after a cycle slip.

Motion-based techniques employ time differences to eliminate integer bias. Such techniques have a number of drawbacks. Specifically, motion-based techniques cannot be applied in real time, and precision may suffer at times due to poor satellite geometry. Further, motion-based techniques for determining ambiguities poorly guard against cycle slips.

Other approaches to resolving integer ambiguities in GPS measurements include integer space searching using signals from multiple satellites and/or current information on the position, such as described in U.S. Pat. No. 5,296,861, the disclosure of which is incorporated herein by reference in its entirety. Such search techniques typically require multiple signals and additional information on position (e.g., attitude, etc.), which potentially create a chicken-and-egg problem. Also, such techniques can be very computationally intensive for long baselines.

Thus, GPS navigation systems, as well as other types of communication links which may benefit from determination of pseudorange, would be significantly enhanced by improved techniques for determining integer phase ambiguities in carrier-based pseudorange measurements, including the capability to rapidly and accurately detect cycle slips.

SUMMARY OF THE INVENTION

Therefore, in light of the above, and for other reasons that become apparent when the invention is fully described, an object of the present invention is to more accurately determine the value of integer phase ambiguities of pseudorange measurements that are based on the carrier phase of navigation signals.

A further object of the present invention is to improve detection of cycle slips in carrier-based pseudorange measurements and to avoid false detection of cycle slips, thereby minimizing the impact of cycle slips on the accuracy of the estimated pseudorange.

Yet a further object of the present invention is to rapidly detect and respond to cycle slips and to rapidly establish the integer ambiguity value under start-up conditions.

A still further object of the present invention is to accurately estimate uncertainty in selection of integer ambiguity values to facilitate appropriate weighting of pseudorange estimates in tracking systems.

Another object of the present invention is to more accurately estimate the pseudorange between and receiver and a signal source.

Yet another object of the present invention is to more accurately estimate the position of a receiver receiving navigation signals.

Still another object of the present invention is to provide enhanced ranging and position determining capabilities in navigation systems such as GPS and other communication systems which can benefit from an accurate determination of range between a transmitter and a receiver.

The aforesaid objects are achieved individually and in combination, and it is not intended that the present invention be construed as requiring two or more of the objects to be combined unless expressly required by the claims attached hereto.

The present invention provides an improved technique for determining the integer value of phase ambiguities, known as "integer ambiguities", of pseudorange measurements that are based on the carrier phase of a received navigation signal, i.e., carrier-based pseudorange measurements. The technique relies on the principles of Bayes's theorem to estimate the probability that each of a group of candidate integer ambiguity values is the true, correct value of the integer ambiguity at the measurement time epoch. After computing the estimated probability for the set of candidate values, the candidate value whose probability is greatest is selected as the value of the integer ambiguity. The probability estimates are computed based on a number of factors, including the code-based pseudorange measurement and the carrier-based pseudorange measurement at the present time epoch, the estimated variability of these measurements, the integer ambiguity probabilities computed at the preceding time epoch, and the probability of a cycle slip from the preceding time epoch to the present time epoch. A cycle slip is detected whenever the value of the integer ambiguity changes from a preceding value.

In comparison to smoothing techniques conventionally used to track the pseudorange, the Bayesian estimation approach of the present invention more accurately determines values of the integer ambiguity of the carrier cycle of the carrier-based pseudorange measurements, particularly at start-up and after cycle slips, and detects and responds to cycle slips much more rapidly.

The present invention also permits estimation of the uncertainty of the selected value of the integer ambiguity based on the estimated probability of the selected integer ambiguity value and estimated probabilities of neighboring integer ambiguity values. The uncertainty estimate can be used in a geographic position tracker, such as a Kalman filter, to appropriately weight the resulting pseudorange estimate in updating the tracked geographic state.

The techniques of the present invention can provide enhanced ranging and position determining capabilities in navigation systems such as GPS and other communication systems which can benefit from an accurate determination of range between a transmitter and a receiver.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
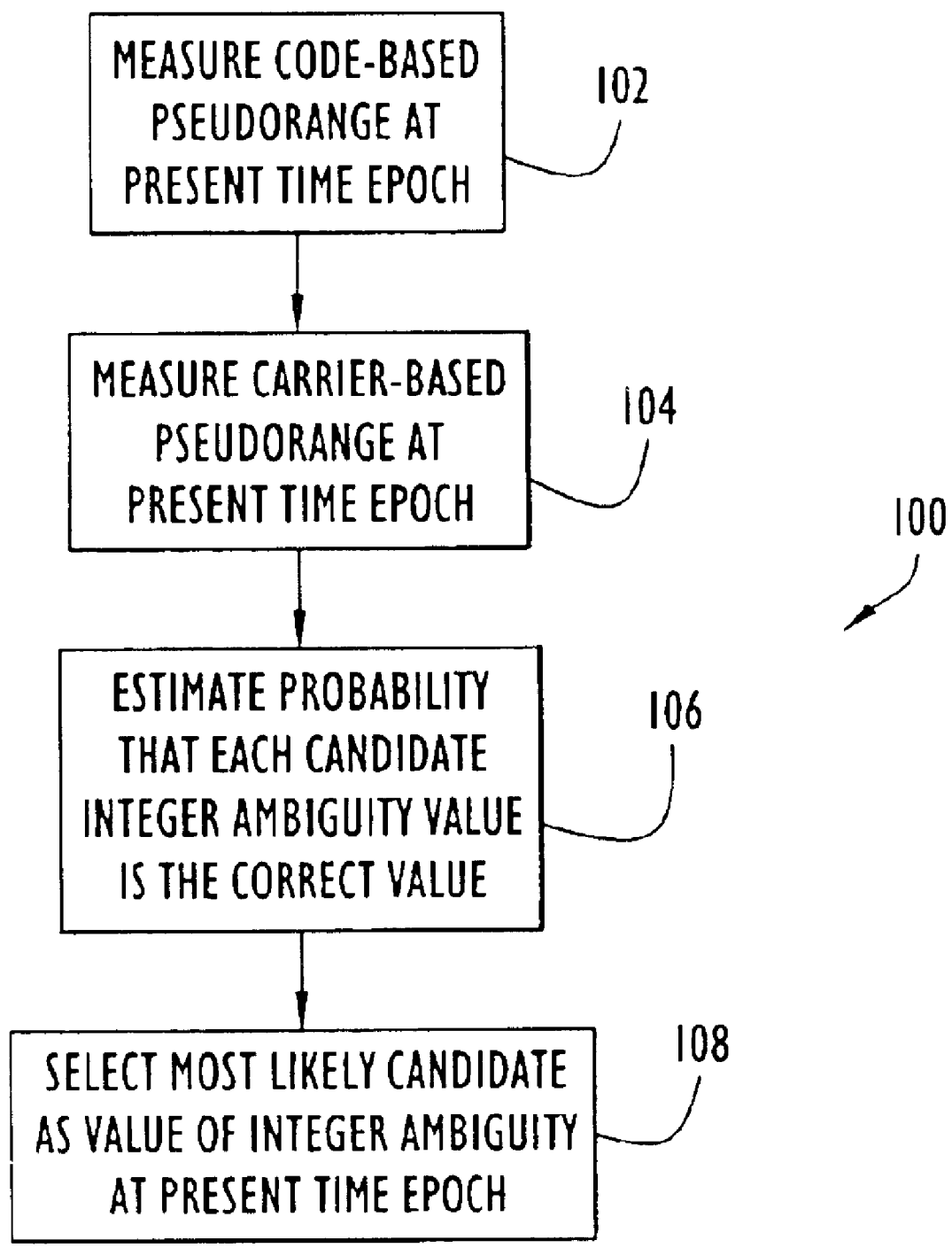
FIG. 1 is a functional flow diagram illustrating a Bayesian estimation technique for determining a value of the integer phase ambiguity of a carrier-based pseudorange measurement in accordance with an exemplary embodiment of the present invention.

The following detailed explanations of FIGS. 1–9 and of the preferred embodiments reveal the methods and apparatus of the present invention. The improved technique for determining phase ambiguities is more closely related to the aforementioned smoothing technique than to the motion-based or integer space search methods, and can be described as "smart smoothing." To provide context, performance of the described smart smoothing technique based on Bayesian estimation will be contrasted to that of the conventional smoothing.

The approach of conventional measurement smoothing is to average code measurements and to use this averaged value to estimate the integer ambiguity in the carrier. This method is able to adjust for cycle slips as well. Suppose that the "true" pseudorange is $R_i$ (where subscript i denotes the time epoch), and a receiver produces a sequence of code measurements $R_i^c$ and a sequence of carrier (phase) measurements $R_i^p$. The integer ambiguity can be estimated at each time epoch as $$N_i = \left\lfloor \frac{1}{\lambda}(R_i^c - R_i^p) \right\rfloor,$$

where $\lfloor \ldots \rfloor$ denotes the operation of rounding a real number to the closest integer, and $\lambda$ is the wavelength. Due to low accuracy of code measurements, such estimation may be inaccurate. However, since the integer ambiguity typically stays constant (barring a cycle slip), the accuracy can be increased by averaging the underlying difference between code and phase measurements:

$$N_i = \left\lfloor \frac{1}{\lambda m} \sum_{j=i-m}^{i-1} (R_j^c - R_j^p) \right\rfloor \quad (1)$$

If cycle slips occur rarely, the averaging interval can be made long enough to produce a robust estimate of $N_i$. Then a good estimate $\overline{R}_i$ of the "true" pseudorange can be obtained by correcting the carrier measurement for the integer ambiguity:

$$\overline{R}_i = R_i^p + \lambda N_i \quad (2)$$

This conventional smoothing technique has a serious shortcoming, however. To make the smoothing technique work, the averaging should be able to reduce the variability of the difference $(R_j^c - R_j^p)$ to a fraction of the wavelength. An incorrect value of $N_i$ would be produced if the error in the average of $(R_j^c - R_j^p)$ exceeds half of the wavelength. For such occurrences to be rare, half of the wavelength should correspond, for example, to three times the standard deviation of the average (i.e., $3\sigma_a$). The standard deviation of the average can be estimated as $$\sigma_a = \frac{1}{\sqrt{m}} \sigma_c,$$

where $\sigma_c$ is the standard deviation of a single code measurement. This gives an estimate for the number of samples in the averaging interval:

$$m = 36 \cdot \left(\frac{\sigma_c}{\lambda}\right)^2 \quad (3)$$

Since $\sigma_c$ is typically much larger than the wavelength, a very large number of measurements is required to ensure the variability of the difference $(R_i^c - R_j^p)$ is a fraction of the wavelength. Moreover, if errors in code measurements are time-correlated, this number should be increased accordingly.

The problems with a long averaging interval are a long start-up time and a gradual relaxation after each cycle slip. These problems are due to the inability of the measurement smoothing to differentiate cases of small and large changes in integer ambiguity. The need to resolve a small change in the ambiguity (i.e., to refine a current estimate by one or two wavelengths) requires long averaging intervals. However, for a large, sudden jump in the integer ambiguity, one does not need to look at the data for a long time to recognize a cycle slip. Conventional smoothing techniques, which have relatively long averaging intervals, cannot respond rapidly to large, sudden cycle slips. Thus, an ideal approach should be based on some kind of decision-making methodology.

The present invention employs a Bayesian estimate method in estimating the integer phase ambiguity, which is capable of determining the integer ambiguity after initial startup (e.g., when a GPS satellite appears in view) or after a cycle slip. The technique treats the cases of start-up and cycle slips largely in the same way. Thus, examples of adjusting for a cycle slip described herein are also fully applicable to the case of start-up conditions. The term "Bayesian" refers to a probabilistic methodology based on the principles of Bayes's theorem which permit computation of inverse or a posteriori probabilities (e.g., the determination of probabilities that each of a set of mutually exclusive conditions existed given that a particular result or event occurred). As described in detail herein, in the context of the present invention, the probabilities being determined by Bayesian estimates are the probabilities of the possible values of the integer ambiguity, while the particular results/events being relied upon include the pseudorange measurements, the probability of cycle slips, and conditions at the preceding time epoch.

A functional flow diagram of the Bayesian methodology 100 for determining the integer ambiguity value at a particular time epoch is shown in FIG. 1. As with conventional smoothing techniques, the Bayesian estimation technique of the present invention requires measurement of the code-based pseudorange $R_i^c$ and the carrier-phase-based pseudo-range measurement $R_i^p$ at the present time epoch i (operations 102 and 104). These pseudorange measurements are generated from received GPS navigation signals according to well-known techniques, as described above.

Fundamentally, one needs to produce an estimate of the integer ambiguity $\overline{N}_i$ at each time epoch i, based on the following data:

1. The history of code measurements $R_j^c$, $j \leq i$ along with the corresponding standard deviation $\sigma_c$. (The standard deviation is assumed to be independent of time, though the method can be generalized to account for variations in $\sigma_c$).
2. The history of carrier measurements $R_j^p$ along with the corresponding standard deviation $\sigma_p$.
3. The probability $P_s$ of a cycle slip at any given time epoch from one particular value to some other particular value.

Instead of concentrating on a single current estimate of $N_i$, presume that there may be multiple possible values. The objective is to compute the probability of having each such possible value (based on measurements) and then to select the most probable value.

At each time epoch there exists a set of M possible values for the integer ambiguity $N_i^n$, where the subscript i denotes the time epoch and superscript n denotes the element in the set M. With each element, there is an associated probability of having this particular value of integer ambiguity at this time epoch, $P_i^n$. Consider the effect of having a new pair of code and carrier phase measurements on the set of probabilities.

Figure 2:
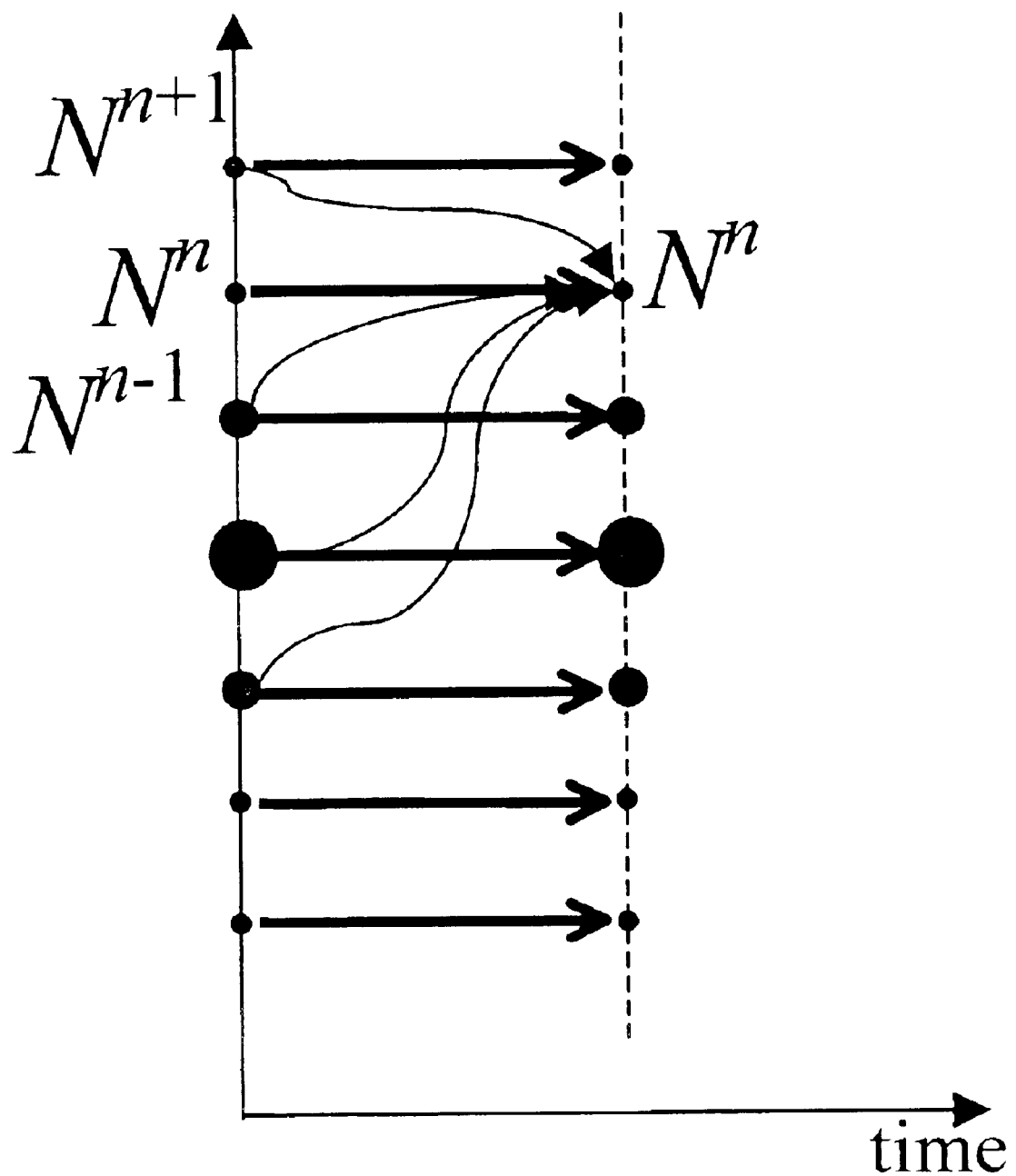
FIG. 2 is an illustration of possible values of integer ambiguity for two consecutive time epochs and possible transitions between the values from the first time epoch to the second time epoch.

Assume that the current true (i.e., correct) value of the integer ambiguity is $N_i^n$. At the previous time epoch, the integer ambiguity may have had the same value (if there was no cycle slip during this epoch), or another value (if there was a cycle slip). This situation is illustrated in FIG. 2, where possible values of integer ambiguities for two consecutive time epochs are shown with dots and transitions between the dots. The size of each dot corresponds to the probability of having that particular integer ambiguity value at that time epoch. The value of the integer ambiguity may change from one time epoch to another (due to cycle slips) or remain constant, as shown by arrows. However, the integer ambiguity value is much more likely to remain constant than to change. Heavy straight arrows denote more likely events of keeping the integer ambiguity value from one time epoch to another, whereas light curvy arrows illustrate less likely events of cycle slips.

Consider one value of $N_i^n$ at the present time epoch. In FIG. 2, this value is shown on the right-hand side as an unlikely value (i.e., the corresponding dot is small). Note that there is another value, which is much more probable and is chosen as the current estimate of the integer ambiguity. Based on consideration of different possibilities, the two most probable events are as follows:

1. The integer ambiguity value remained constant from the previous time epoch (the low probability of this value at the previous time epoch is complemented by a high probability of the integer ambiguity value remaining the same), or
2. The integer ambiguity value slipped from the most probable one at the previous time epoch (the high probability of this value at the previous time epoch is complemented by a low probability of a slip).

All other events require a superposition of two low-probability conditions, a low probability of an integer ambiguity value at the previous time epoch and a cycle slip from that low-probability value. In general, such events may be included in the analysis. For the sake of simplicity and efficiency of the technique, however, the possibility of such low-probability events can be neglected. This simplification enables development of a formula for the probability of having the value of $N_i^n$ in the absence of additional information:

$$\hat{P}_i^n = P_{i-1}^{n0} \cdot P_s + P_{i-1}^n \cdot (1 - P_s)^M \quad (4)$$

where $P_{i-1}^{n0}$ is the probability of the most likely ambiguity value at the previous time epoch i−1 (the one with the largest dot in FIG. 2).

Note, however, that additional information is available; namely, the measurement data at the present time epoch (i.e., the measured values of the code-based pseudorange $R_i^c$ and the carrier-phase-based pseudorange $R_i^p$). To account for this information, a computation is made of the probability that code and carrier phase measurements would respectively produce values $R_i^c$ and $R_i^p$ under condition that the ambiguity value is $N_i^n$. If code and carrier phase pseudorange measurements were absolutely accurate, the following condition would be true:

$$R_i^c - R_i^p - \lambda N_i^n = 0 \quad (5)$$

The non-zero value would be due to errors in the code and carrier phase measurements. Standard deviations of these errors are assumed to be known. A variety of statistical distributions for the errors can be employed in the present invention. In a preferred embodiment, errors in the code and carrier phase measurements are described by the Gaussian statistics, and the probability to observe values $R_i^c$ and $R_i^p$ (under condition that the ambiguity value is $N_i^n$) is proportional to:

$$P_{meas} = \exp\left(-\frac{(R_i^c - R_i^p - \lambda N_i^n)^2}{\sigma_c^2 + \sigma_p^2}\right) \quad (6)$$

It will be understood by those skilled in the art that different expressions for $P_{meas}$ would apply for non-Gaussian error distributions, depending upon the particular non-Gaussian distribution.

The total probability of having the ambiguity value of $N_i^n$ can now be computed based on probabilities of events 1 and 2 above and on the probability of observing measurements $R_i^c$ and $R_i^p$:

$$P_i^n = (P_{i-1}^{n0} \cdot P_s + P_{i-1}^n \cdot (1 - P_s)^M) \cdot \exp\left(-\frac{(R_i^c - R_i^p - \lambda N_i^n)^2}{\sigma_c^2 + \sigma_p^2}\right) \quad (7)$$

Referring again to FIG. 1, in operation 106, the probability that each of the candidate integer ambiguity values $N_i^n$ is the correct integer ambiguity value at time epoch i can be estimated using equation (7). This process is repeated for all candidate values of $N_i^n$. Once all of the values $P_i^n$ have been computed, the value of $N_i^n$ having the greatest probability $P_i^n$ is identified as the most probable integer ambiguity value (i.e., the most likely to be the correct value) and is selected as the current estimate of the integer ambiguity at the present time epoch (operation 108). If this estimate is different from the estimate at the previous time epoch, a cycle slip is detected.

As a practical matter, successful multiplications of probabilities would very quickly result in computer underflows. However, it is sufficient to compute logarithms of probabilities. This has the added benefit of eliminating the exponent computation and of most multiplications. As used herein and in the claims, the terms "probability" and "probabilities" broadly refer to computations or estimates of the relative likelihood of candidate integer ambiguity values being the correct integer ambiguity value, and encompass both computations of "true" probability (wherein the sum of the probabilities of the set of possible events is unity) and computations of "relative" probability, in which the computed probability values do not necessarily sum to unity but nevertheless provide an indication of greater or lesser likelihood of certain events relative to other events (e.g., logarithms of probabilities).

Figure 3:
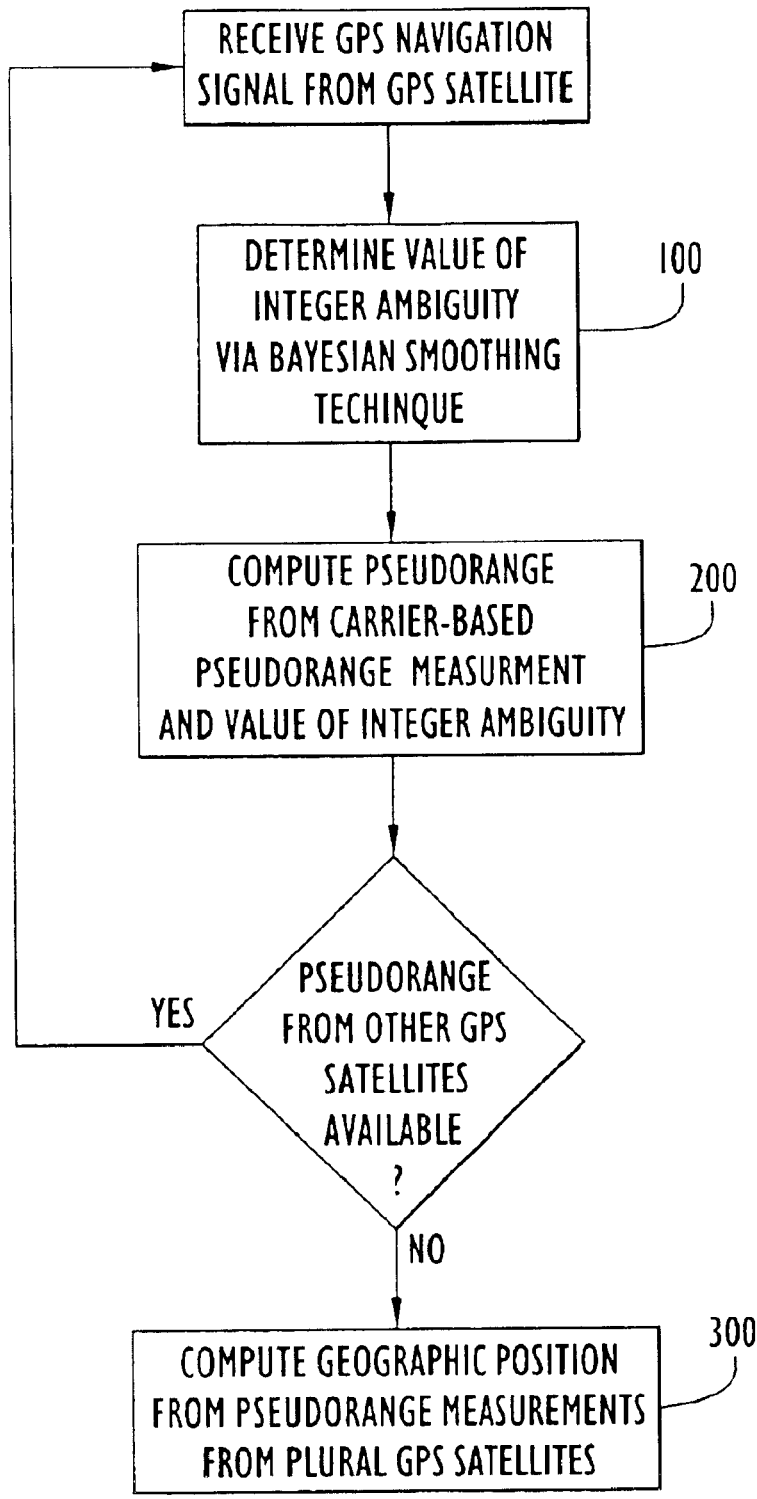
FIG. 3 is a function flow diagram illustrating a process of estimating pseudoranges and geographic position in accordance with an exemplary embodiment of the present invention.

Once the value of the integer ambiguity has been selected at the present time epoch, the pseudorange and, ultimately, the geographic position of the receiver can be determined. Referring to FIG. 3, upon reception of a GPS navigation signal from a GPS satellite, the value of the integer ambiguity of the carrier phase pseudorange measurement is determined in accordance with the above-described Bayesian estimation technique (operation 100). In operation 200, the pseudorange from the receiver to the GPS satellite can be estimated at each time epoch using equation (2), based on the carrier-phase pseudorange measurement and the estimated value of the integer ambiguity. If pseudorange measurements from additional GPS satellites are available to compute the geographic position of the receiver, the process is repeated for other GPS satellites. When the pseudorange measurements available to compute the receiver's geographic position have been obtained, the geographic position is computed using conventional trilateration principles (operation 300).

Figure 4:
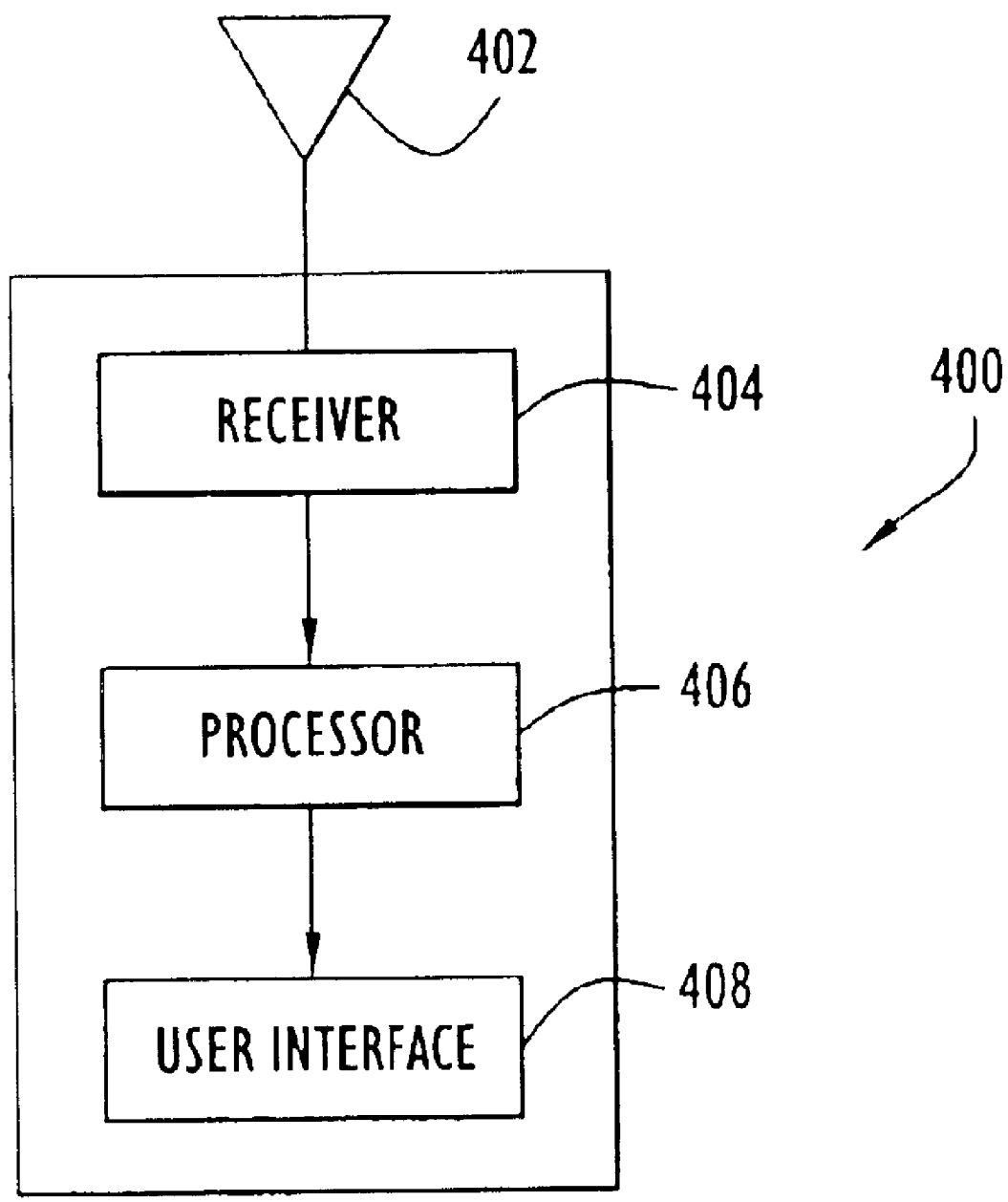
FIG. 4 is a functional block diagram illustrating a navigation device capable of accurately determining integer phase ambiguities, cycle slips, pseudorange and geographic position in accordance with an exemplary embodiment of the present invention.

FIG. 4 is a functional block diagram of a navigation device 400 for determining geographic position using smart smoothing Bayesian estimation techniques for more accurately determining integer phase ambiguities and cycle slips, pseudorange and receiver position. Navigation device 400 includes a conventional antenna 402 and GPS receiver 404 for receiving GPS signals. The receiver determines the code-based and carrier-based pseudorange measurements at each time epoch in a conventional manner. Processor 406 estimates the probability that each candidate integer ambiguity value is the correct value in accordance with the relationship expressed in equation (7), selects the most likely candidate value as the value of the integer ambiguity, and estimates the pseudorange in accordance with equation (2). Based on pseudorange measurements from a sufficient number of GPS satellites, processor 406 estimates the geographic position of the navigation device. Navigation device 400 may include a user interface and supplies the geographic position to a user interface 408 which can include any of a variety of aural and/or visual indicators (e.g., speakers, display, printer, etc.). Navigation device 400 can be embodied in any of a wide variety of communication devices, including, but not limited to: any type of computer; a handheld or body-mounted radio; any type of mobile or wireless telephone (e.g., analog cellular, digital cellular, PCS or satellite-based); a pager, beeper or PDA device; a wrist watch or any other personal time-keeping device; a radio carried on, built into or embedded in a ground-based or airborne vehicle; any portable electronic device equipped with wireless reception capabilities, including multimedia terminals capable of receiving and/or transmitting audio, video and/or data information, or any other communication device in which a GPS receiver may have utility.

It will be understood that the navigation device of the present invention is not limited to the embodiment shown in FIG. 4. For example, the device may include multiple antennas where single or double-differencing of pseudor-ange measurements is employed. The "receiver" depicted in FIG. 4 may encompass any combination of signal processing and data processing hardware required to detect navigation signals and measure the code-base and carrier-based pseudorange, including any necessary of RF, IF and baseband equipment or other processors. Likewise, the processor depicted in FIG. 4 may encompass any processing equipment required to perform the computations required to determine the integer ambiguity, the estimated pseudorange, and the estimated geographic position.

It is instructive to consider a special case in which slips are not possible, i.e. when $P_s=0$. For a Bayesian estimate, the main recursive equation takes the following form:

$$P_i^n = P_{i-1}^n \cdot \exp\left(-\frac{(R_i^c - R_i^p - \lambda N_i^n)^2}{\sigma_c^2 + \sigma_p^2}\right) \quad (8)$$

It may be assumed that at the very first time epoch, probabilities for all values of the ambiguity are equal. Then the probability at each epoch is given by:

$$P_i^n = P_0 \cdot \prod_i \exp\left(-\frac{(R_i^c - R_i^p - \lambda N_i^n)^2}{\sigma_c^2 + \sigma_p^2}\right) \quad (9)$$

The estimated value of the ambiguity maximizes $P_i^n$. Even though $N_i^n$ is a discrete variable, the maximum of $P_i^n$ can be found by computing its derivative with respect to $N_i^n$. The condition $$\frac{\partial P_i^n}{\partial N_i^n} = 0$$

is equivalent to the following:

$$\sum_i R_i^c - R_i^p - \lambda N_i^n = 0 \quad (10)$$

This expression is the same as $$N_i = \frac{1}{\lambda i} \sum_{j=1}^{i} (R_j^c - R_j^p), \quad (11)$$

which is the same as the conventional smoothing algorithm (see Equation (1)), where the averaging interval starts from the very first epoch and is extended indefinitely as time progresses. This is an intuitively correct result: if it is known that slips never occur, one wants to average data for as long as possible.

Figure 5:
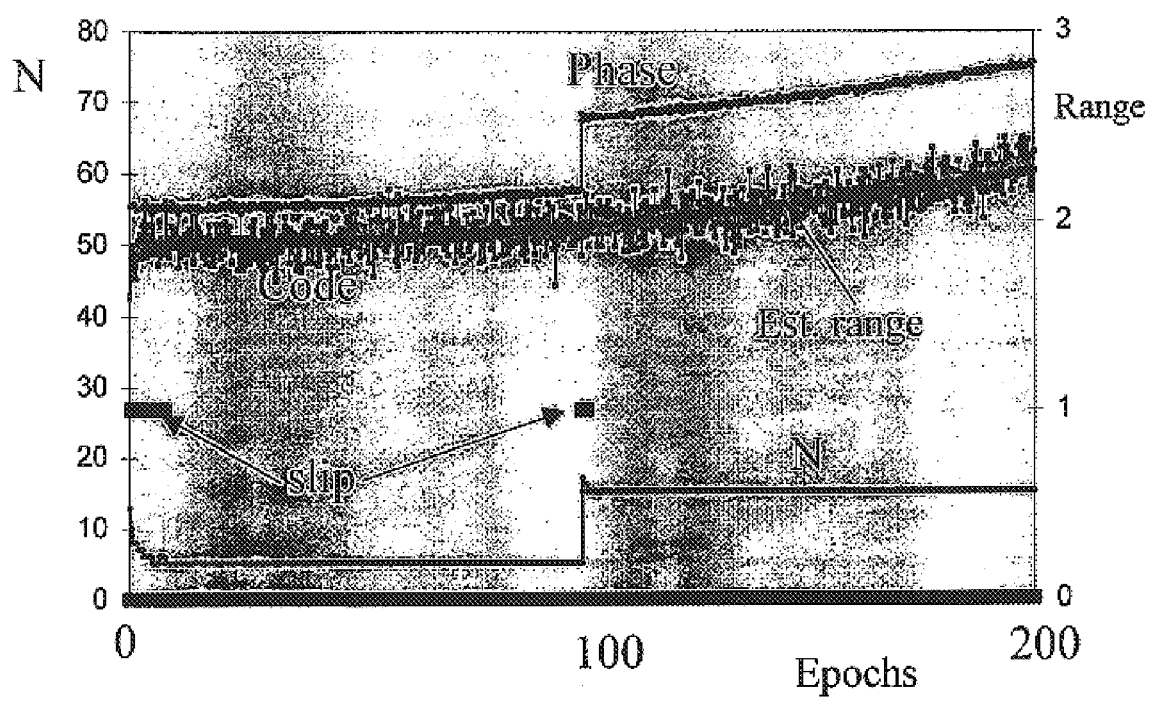
FIG. 5 is a graph illustrating simulated performance of the Bayesian estimation technique of the present invention in detecting a cycle slip of several carrier cycles, determining the integer phase ambiguity, and estimating the pseudorange.

FIG. 5 illustrates results of a simulation of the Bayesian estimation technique with respect to performance in responding to start-up and cycle slip conditions. The simulation included two-hundred time epochs. At each time epoch, the simulation was supplied with input code and carrier phase pseudorange measurements. Standard deviations of code and phase measurements were assumed to be 2.2 and 0.22 of the wavelength, respectively. As can be seen in FIG. 5, the noise error of the simulated input code measurements is considerably greater than that of the carrier-phase measurements. At time epoch 100, a cycle slip of ten wavelength was introduced into the carrier-phase pseudorange measurement.

Also shown in FIG. 5 are the estimated value of N, an indication of the time epochs at which cycle slips are detected, and the resultant estimated pseudorange. The simulation results indicate that the Bayesian estimation technique rapidly converges on the correct value of the integer ambiguity after start-up and immediately corrects for the cycle slip. Further, the Bayesian estimation technique avoids false detection of cycle slips throughout the simulation.

Figure 6:
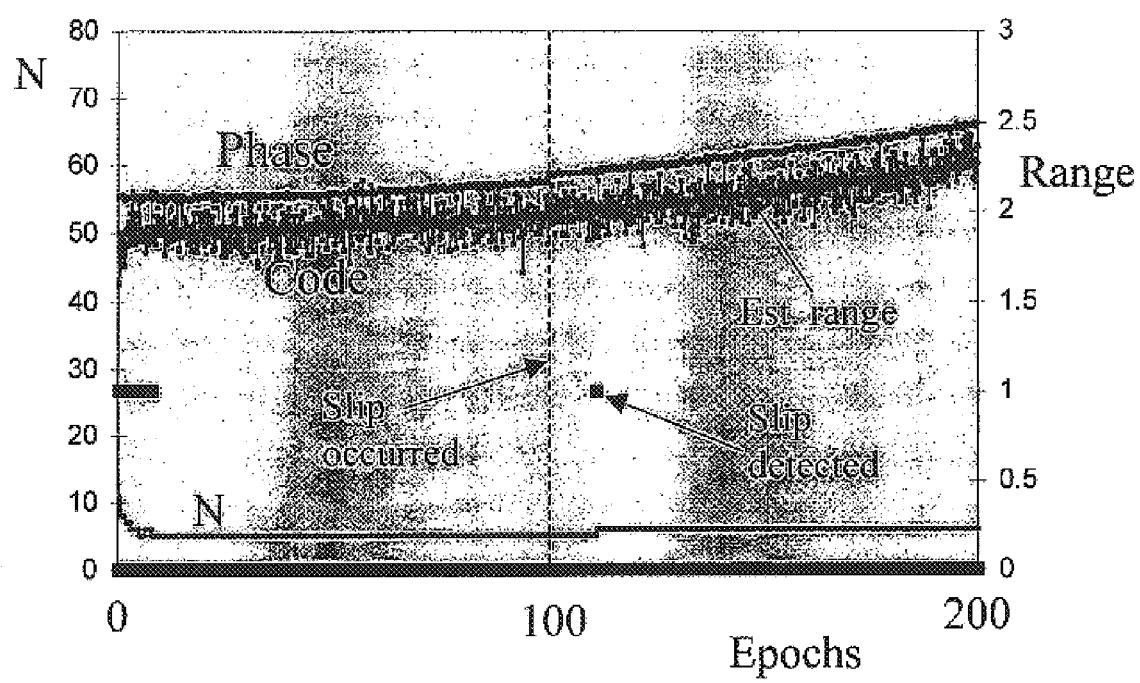
FIG. 6 is a graph illustrating simulated performance of the Bayesian estimation technique of the present invention in detecting a cycle slip of a single carrier cycle.

The primary difference between the Bayesian approach and conventional smoothing methods is that the former detects a change in the integer ambiguity value as soon as the change becomes supported by the data. For a large change in the integer ambiguity value, this detection occurs immediately; for a small change, which is less apparent, detection of the cycle slip requires processing more data. FIG. 6 illustrates the response of the Bayesian estimation technique to detecting a small cycle slip. In the scenario shown in FIG. 6, the value of integer ambiguity is changed by only one wavelength at time epoch 100. In this case, the Bayesian estimation technique detected the cycle slip a number of time epochs after the cycle slip had actually occurred. Thus, the Bayesian estimation technique is flexible and requires just the necessary time to detect a cycle slip. Conventional smoothing algorithms lack such flexibility, and must be configured for the worst-case scenario (in practice, the averaging interval should be made long enough to enable detection of small slips).

Similar considerations apply to the initial ambiguity estimation. If a current estimate is "off" by one or two wavelengths, the error must be detected and corrected by the algorithm. The Bayesian estimation method does this correction "just in time."

Figure 7:
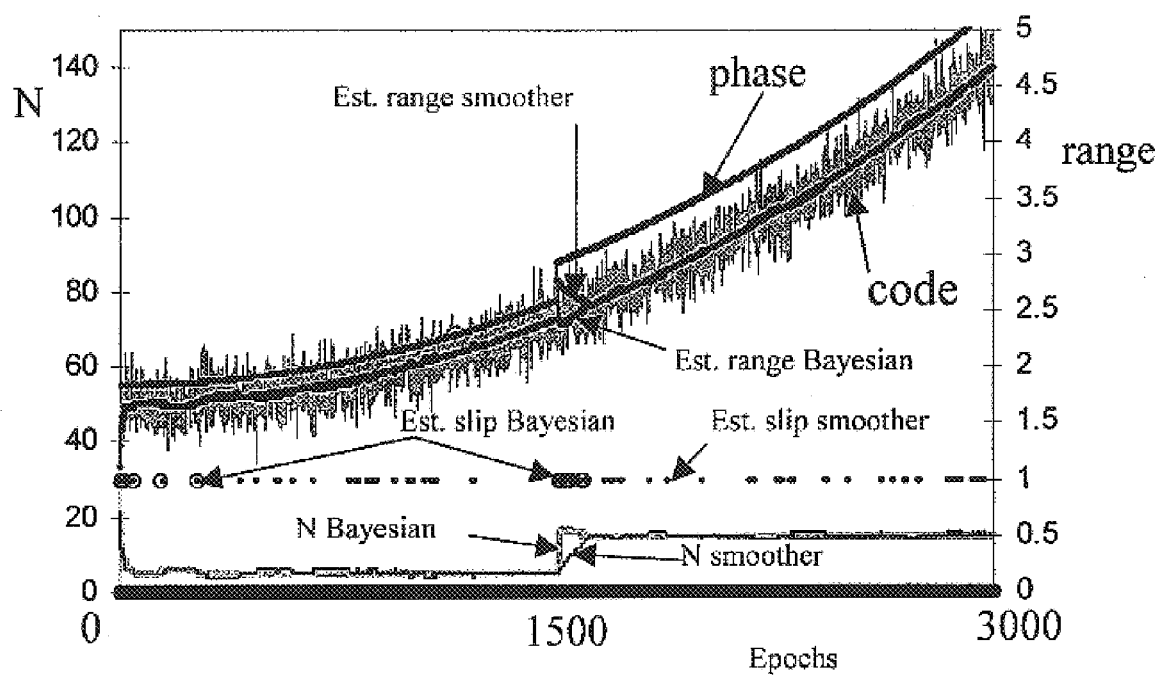
FIG. 7 is a graph comparing the simulated performance of the Bayesian estimation technique of the present invention with that of conventional smoothing techniques in detecting and responding to cycle slips and estimating the pseudorange.

FIG. 7 provides a comparison of the performance of a conventional smoothing technique to the Bayesian estimation technique under the same simulation scenario (i.e., the same simulated data was processed according to the Bayesian and convention smoothing techniques). A cycle slip was introduced in the middle of the simulation. The total length of the simulation was three-thousand time epochs. The standard deviation of code measurements was assumed to be 5 wavelengths, and standard deviation of phase measurements was assumed to be 0.05 wavelengths. The averaging interval for the smoother was assumed to be one-hundred and twenty time epochs. As seen in FIG. 7, there were far fewer false slip detections (adjustments of the ambiguity) in the Bayesian estimation process than in the conventional smoothing process. Also, in the vicinity of the actual cycle slip, the Bayesian estimation technique adjusted the integer ambiguity value faster, whereas the smoothing algorithm required waiting for the duration of the averaging interval to do a full adjustment. Consequently, the pseudorange estimate resulting from the Bayesian estimation process was more accurate than that of the conventional smoothing process, particularly after start-up, the cycle slip and the instances of false cycle slips detected by the conventional smoothing process.

Since the Bayesian estimation technique computes probabilities of having different values of the ambiguity, one can detect instances in which the selected ambiguity value is only marginally better then other values. The degree of the differences in the computed probabilities would indicate an uncertainty in estimating the integer ambiguity value. The simplest way to estimate the uncertainty in the integer ambiguity estimate is to compare the logarithm of the probability of having the estimated value of the integer ambiguity with its two neighbors (i.e., the next higher ambiguity value and the next lower ambiguity value). It will be appreciated by those skill ed in the art that a variety of other methods for estimating uncertainty based on the probabilities of the candidate ambiguity values are also possible, including those which involve probabilities of additional adjacent ambiguity values. As used herein and in the claims, the term "adjacent" refers to integer ambiguity values that are in the vicinity of the estimated value of the integer ambiguity, including the two immediate neighboring values and/or more distant values.

Figure 8:
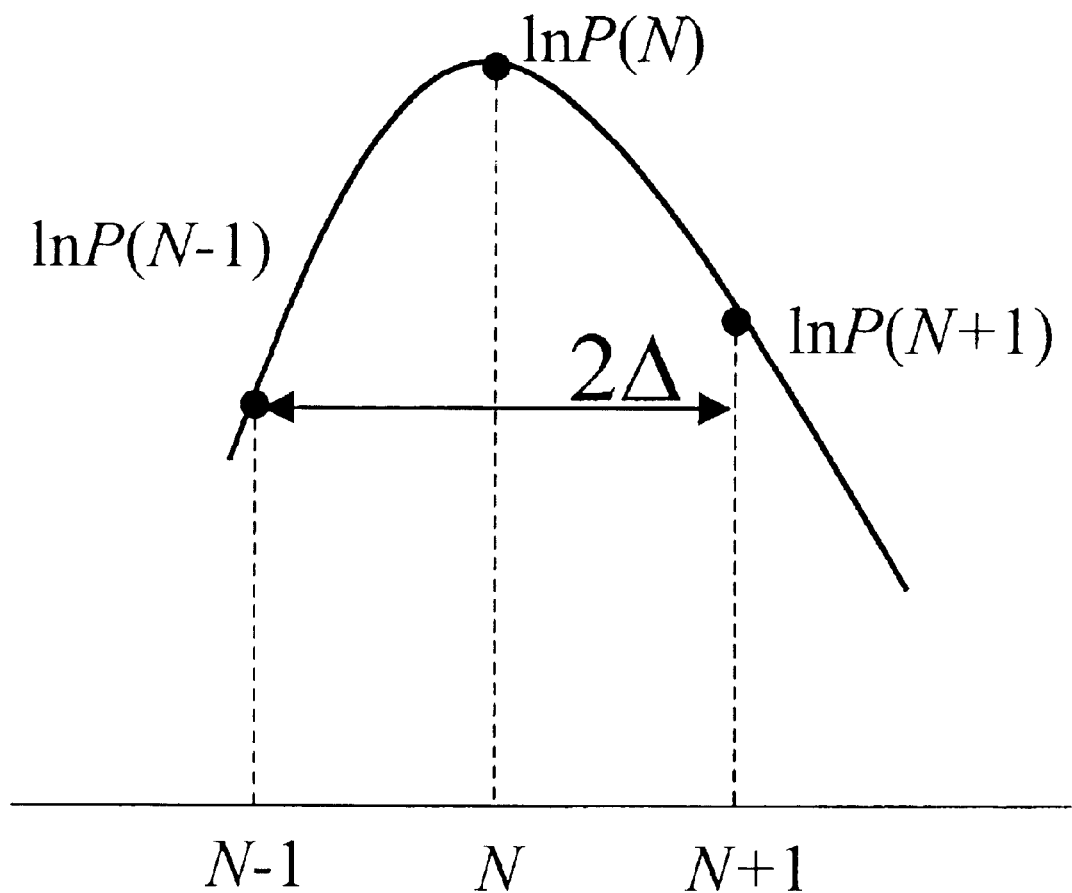
FIG. 8 is a graph illustrating the principles underlying estimating the uncertainty of the integer ambiguity estimate in accordance with an exemplary embodiment of the present invention.
Figure 9:
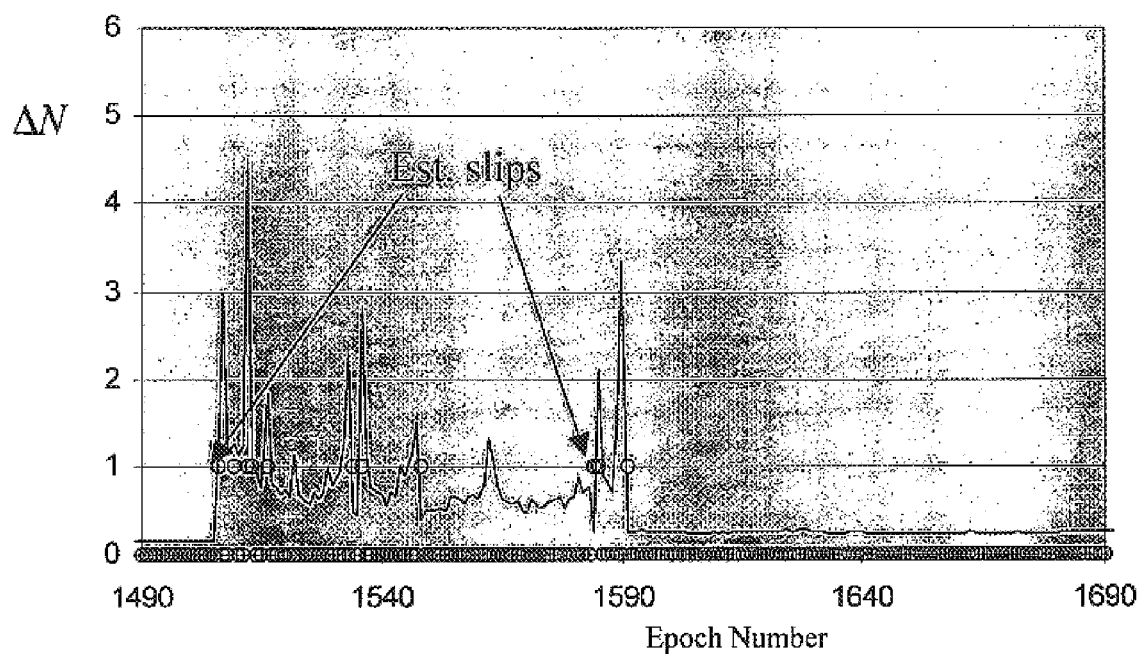
FIG. 9 is a graph illustrated simulation results for estimating the uncertainty in the integer ambiguity estimate.

FIG. 8 illustrates the estimated integer ambiguity value (i.e., the ambiguity value with the highest probability) and two of its adjacent values. A quadratic curve can be drawn through these three points (optionally, more than three values could be used), and then a change in the integer ambiguity value N can be estimated, which results in a decrease in the probability by the factor of e. A formula for this computation is as follows:

$$\Delta N = \frac{1}{\sqrt{2 \cdot \ln(P_i^{n0}) - \ln(P_i^{n0-1}) - \ln(P_i^{n0+1})}} \quad (12)$$

where $P_i^{n0}$ is the probability of the most likely ambiguity value, and $P_i^{n0-1}$ and $P_i^{n0+1}$ are the probabilities of the next lowest and next highest ambiguity value s, respectively. FIG. 9 shows $\Delta N$ for a section of the simulation presented in FIG. 7 in the vicinity of a cycle slip. It can be seen that, even though the estimate for ambiguity is adjusted a few times, the uncertainty remains at a relatively high level until the ambiguity settles at the final, correct value.

The estimate of the uncertainty is an important feature of the technique of the present invention. Typically, pseudorange measurements are used as an input to a Kalman filter or a similar estimator to determine the user position (or user attitude, etc.) Commonly used estimators (including the Kalman filter) require providing measurement uncertainty (in addition to the measurements). If uncertainty is relatively high, the corresponding measurement is de-weighed by the Kalman filter and then has little effect on the final result. Conversely, if uncertainty is relatively low, the filter gain is set higher, resulting in the measurement being more heavily relied upon in estimating the tracked position. Thus, even if the Bayesian estimate is unable to instantaneously correct the estimate for the integer ambiguity after a cycle slip, the uncertainty estimate mitigates the adverse effect of a cycle slip on the position estimation accuracy.

The foregoing description presents an exemplary embodiment of the Bayesian techniques of the present invention. It will be understood, however, that the present invention is not limited to the particular embodiment described, and several variations and enhancements can be implemented as desired or necessitated by operational requirements. For example, in the foregoing example, the variance (and, hence, standard deviation) of the pseudorange measurements where assumed to be constant. However, the methodology can be extend in a straightforward manner to cases where the variance of pseudorange measurements is not constant.

In the foregoing description, the integer ambiguity values are estimated for the pseudorange measurements from each GPS satellite independently. In other words, pseudorange measurements from one satellite are not taken into consideration in the determination of integer ambiguities of pseudorange measurement from other satellites. However, if a receiver tracks carrier and code pseudoranges for several satellites, measurements are not independent, since there are only three spatial degrees of freedom, plus the receiver clock offset. Thus, a particular combination of pseudorange measurements (resulting from selection of certain integer ambiguities) may be inconsistent and therefore unlikely. In accordance with the present invention, the Bayesian methodology may be extended to estimate the consistency of the entire set of integer ambiguities (corresponding to the set of satellites). In this case, the formula for $P_{meas}$ in Equation (6) is modified to include all available measurements.

In accordance with another aspect of the present invention, the likelihood of a pseudorange value can be limited by a propagation model as well. For example, a propagation model may limit the typical acceleration of the user's receiver to a certain range. Thus, if selection of a particular ambiguity value would imply improbable or impossible changes in the position, velocity or acceleration of the receiver, the probability of the particular ambiguity value can be reduced (or set to zero) accordingly.

In accordance with yet another aspect of the invention, the estimation of the integer ambiguity under start-up conditions can be enhanced. Consider a typical GPS navigation application, which has GPS satellites coming into and going out of view over time. For any GPS satellite just coming into view, one needs to estimate the integer ambiguity. If a navigation process uses a Kalman filter, a variance of the navigation solution is available in addition to the solution itself. The position estimate and its variance can be used along with the first phase measurement(s) from a new GPS satellite to initialize the probabilities in the Bayesian methodology. This enhancement establishes a favored candidate for the integer ambiguity value from the very beginning as each new satellite comes into view. All of the foregoing aspects of the present invention enhance the differentiation between candidate values of ambiguities and therefore facilitate convergence to a correct integer ambiguity value.

While the Bayesian technique of the present invention provides considerable advantages over known techniques, optionally, the Bayesian technique may nevertheless be used in combination with other processing techniques. Thus, for example the Bayesian technique can optionally be used with the aforementioned integer space search methods, such as those described in U.S. Pat. No. 5,296,861.

While the foregoing description relates to determination of the "pseudorange", the results are equally (or perhaps even more) applicable to measurement processing techniques involving single- or double-differencing of pseudorange measurements. Thus, as used herein and in the claims, the term pseudorange encompasses all of these pseudorange-based measurement types.

Similarly, while the present invention has been described in the context of a GPS navigation system, it will be understood that the techniques of the present invention are applicable in virtually any communication or navigation system in which phase-based measurements can be used to determine range between two communication devices. For example, spread-spectrum communication links, such as telecommunication links, may be used to determine the range between the transmitter and the receiver.

Having described preferred embodiments of new and improved methods and apparatus for determining phase ambiguities in ranging and navigation systems, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of determining a value of an integer ambiguity of a carrier-based pseudorange measurement at a time epoch, wherein the integer ambiguity indicates an integer number of carrier wavelengths that the carrier-based pseudorange measurement is offset from an absolute pseudorange, the method comprising:
   (a) measuring the absolute pseudorange at the time epoch based on a received signal, thereby forming an absolute pseudorange measurement;
   (b) measuring a carrier-based pseudorange at the time epoch based on a carrier phase of the received signal, thereby forming the carrier-based pseudorange measurement;
   (c) estimating a probability that each of a plurality of candidate integer ambiguity values is a correct value of the integer ambiguity at the time epoch based on the absolute pseudorange measurement and the carrier-based pseudorange measurement, thereby determining which of the candidate integer ambiguity values is the most likely integer ambiguity value to be the correct value; and
   (d) selecting the most likely integer ambiguity value as the value of the integer ambiguity at the time epoch.

2. The method of claim 1, wherein (c) includes estimating the probability that each of the plurality of candidate integer ambiguity values is the correct value based on a Bayesian estimate.

3. The method of claim 1, wherein the absolute pseudorange is measured by making a code-based pseudorange measurement based on a modulation code of the received signal.

4. The method of claim 1, wherein a change in the value of the integer ambiguity indicates a cycle slip in the carrier-based pseudorange measurement, and wherein the probability of each candidate integer ambiguity being the correct value of the integer ambiguity is determined as a function of the probability of a cycle slip.

5. The method of claim 1, wherein the probability of each candidate integer ambiguity being the correct value of the integer ambiguity is determined as the function of the probability at the preceding time epoch of the candidate integer ambiguity being the correct value and the probability at the preceding time epoch of the most likely integer ambiguity being the correct value.

6. The method of claim 1, wherein the probability of each candidate integer ambiguity being the correct value of the integer ambiguity is determined as a function of a variability of the absolute pseudorange measurement and a variability of the carrier-based pseudorange measurement.

7. The method of claim 1, wherein the probability $P_i^n$ of the value $N_i^n$ of each candidate integer ambiguity n being the correct value of the integer ambiguity at time epoch i is computed based on the relationship:

$$P_i^n = (P_{i-1}^{n0} \cdot P_s + P_{i-1}^n \cdot (1-P_s)^M) \cdot \exp\left(-\frac{(R_i^c - R_i^p - \lambda N_i^n)^2}{\sigma_c^2 + \sigma_p^2}\right)$$

where $P_{i-1}^{n0}$ is the probability at the preceding time epoch of the most likely ambiguity value being the correct value, $P_{i-1}^n$ is the probability at the preceding time epoch of the candidate integer ambiguity value being the correct value, $P_s$ is the probability of a cycle slip occurring in the carrier-based pseudorange measurement from the preceding time epoch to the time epoch, where a cycle slip is a change in the value of the integer ambiguity, M is the number of candidate integer ambiguity values, $R_i^c$ is the absolute pseudorange measurement, $R_i^p$ is the carrier-based pseudorange measurement, $\lambda$ is the carrier wavelength, $\sigma_c^2$ is the standard deviation of the absolute pseudorange measurement, and $\sigma_p^2$ is the standard deviation of the carrier-based pseudorange measurement.

8. The method of claim 7, wherein the probabilities of the candidate integer ambiguity values are computed as logarithms of probabilities to avoid computational underflows.

9. The method of claim 1, further comprising:
   (e) estimating an uncertainty in the value of the integer ambiguity at the time epoch based on the probability of the value of the integer ambiguity being the correct value of the integer ambiguity.

10. The method of claim 9, wherein (e) further comprises estimating the uncertainty in the value of the integer ambiguity at the time epoch based on probabilities of values adjacent the value of the integer ambiguity being the correct value of the integer ambiguity.

11. The method of claim 1, further comprising:
    (e) estimating the pseudorange at the time epoch based on the carrier-based pseudorange measurement and the value of the integer ambiguity at the time epoch.

12. The method of claim 11, wherein the received signal is transmitted from a global position system (GPS) satellite, and wherein the estimated pseudorange reflects a range to the GPS satellite.

13. The method of claim 12, wherein (a) though (e) are performed with signals from a plurality of GPS satellites, wherein the method further comprises:
    (f) determining a geographic position based on estimated pseudoranges to the plurality of GPS satellites.

14. A method of detecting a cycle slip in a carrier-based pseudorange measurement, indicated by a change in a value of an integer ambiguity which indicates an integer number of carrier wavelengths from which the carrier-based pseudorange measurement is offset from an absolute pseudorange, the method comprising:
    (a) measuring the absolute pseudorange at a time epoch based on a received signal, thereby forming an absolute pseudorange measurement;
    (b) measuring a carrier-based pseudorange at the time epoch based on a carrier phase of the received signal, thereby forming the carrier-based pseudorange measurement;
    (c) estimating a probability that each of a plurality of candidate integer ambiguity values is a correct value of the integer ambiguity at the time epoch based on the absolute pseudorange measurement and the carrier-based pseudorange measurement, thereby determining which of the candidate integer ambiguity values is the most likely integer ambiguity value to be the correct value; and
    (d) determining that a cycle slip has occurred in response to the most likely integer ambiguity value at the time epoch being different from a value of the integer ambiguity at a preceding time epoch.

15. An apparatus for determining geographic position based on pseudorange measurements, comprising:
    a receiver configured to receive navigation signals from a plurality of sources, wherein, for each navigation signal, said receiver generates an absolute pseudorange measurement and a carrier-based pseudorange measurement based on a carrier phase of the navigation signal, the carrier-based pseudorange measurement being offset from the absolute pseudorange by an integer ambiguity which is an integer number of carrier wavelengths; and a processor configured to estimate, for each carrier-based pseudorange measurement, a probability that each of a plurality of candidate integer ambiguity values is a correct value of the integer ambiguity based on the absolute pseudorange measurement and the carrier-based pseudorange measurement, and selecting a most likely of the candidate integer ambiguity values as the value of the integer ambiguity, said processor estimating the pseudorange for each navigation signal based on the carrier-based pseudorange measurement and the value of the integer ambiguity corresponding to the navigation signal, and computing the geographic position of the apparatus from pseudoranges estimated from the navigation signals.

16. The apparatus of claim 15, wherein said processor estimates the probability that each of the plurality of candidate integer ambiguity values is the correct value based on a Bayesian estimate.

17. The apparatus of claim 15, wherein said receiver measures the absolute pseudorange by generating a code-based pseudorange measurement based on a modulation code of each navigation signal.

18. The apparatus of claim 15, wherein a change in the value of the integer ambiguity indicates a cycle slip in the carrier-based pseudorange measurement, and wherein said processor determines the probability of each candidate integer ambiguity being the correct value of the integer ambiguity as a function of the probability of a cycle slip.

19. The apparatus of claim 15, wherein said processor determines the probability of each candidate integer ambiguity being the correct value of the integer ambiguity as the function of the probability the candidate integer ambiguity being the correct value at a time of a previous pseudorange measurement and the probability of the most likely integer ambiguity being the correct value at the time of the previous pseudorange measurement.

20. The apparatus of claim 15, wherein said processor determines the probability of each candidate integer ambiguity being the correct value of the integer ambiguity as a function of a variability of the absolute pseudorange measurement and a variability of the carrier-based pseudorange measurement.

21. The apparatus of claim 15, wherein the probability $P_i^n$ of the value $N_i^n$ of each candidate integer ambiguity n being the correct value of the integer ambiguity at time i is computed by:

$$P_i^n = (P_{i-1}^{n0} \cdot P_s + P_{i-1}^n \cdot (1 - P_s)^M) \cdot \exp\left(-\frac{(R_i^c - R_i^p - \lambda N_i^n)^2}{\sigma_c^2 + \sigma_p^2}\right)$$

where $P_{i-1}^{n0}$ is the probability at a previous measurement time of the most likely ambiguity value being the correct value, $P_{i-1}^n$ is the probability at the previous measurement time of the candidate integer ambiguity value being the correct value, $P_s$ is the probability of a cycle slip occurring in the carrier-based pseudorange measurement, where a cycle slip is a change in the value of the integer ambiguity, M is the number of candidate integer ambiguity values, $R_c^c$ is the absolute pseudorange measurement, $R_i^p$ is the carrier-based pseudorange measurement, $\lambda$ is the carrier wavelength, $\sigma_c^2$ is the standard deviation of the absolute pseudorange measurement, and $\sigma_p^2$ is the standard deviation of the carrier-based pseudorange measurement.

22. The apparatus of claim 15, wherein said processor estimates an uncertainty in the value of the integer ambiguity based on the probability of the value of the integer ambiguity being the correct value of the integer ambiguity.

23. The apparatus of claim 22, wherein said processor estimates the uncertainty in the value of the integer ambiguity based on probabilities of values adjacent the value of the integer ambiguity being the correct value of the integer ambiguity.

24. The apparatus of claim 15, wherein said receiver comprises a global position system (GPS) receiver and the navigation signals originate from GPS satellites, and wherein pseudoranges estimated by said processor reflect ranges to the GPS satellites.

25. An apparatus for determining geographic position based on pseudorange measurements, comprising:

means for receiving navigation signals from a plurality of sources generating an absolute pseudorange measurement and a carrier-based pseudorange measurement based on a carrier phase of each of the navigation signals, the carrier-based pseudorange measurement being offset from the absolute pseudorange by an integer ambiguity which is an integer number of carrier wavelengths;

means for estimating, for each carrier-based pseudorange measurement, a probability that each of a plurality of candidate integer ambiguity values is a correct value of the integer ambiguity based on the absolute pseudorange measurement and the carrier-based pseudorange measurement, and for selecting a most likely of the candidate integer ambiguity values as the value of the integer ambiguity; and means for estimating the pseudorange for each navigation signal based on the carrier-based pseudorange measurement and the value of the integer ambiguity corresponding to the navigation signal, and for computing the geographic position of the apparatus from pseudoranges estimated from the navigation signals.

* * * * *